United States Patent [19]

Gelman et al.

[11] 4,001,120
[45] Jan. 4, 1977

[54] WATER FILTER DEVICE

[75] Inventors: Charles Gelman; Attila Vadnay, both of Ann Arbor, Mich.

[73] Assignee: Gelman Instrument Company, Ann Arbor, Mich.

[22] Filed: Nov. 13, 1975

[21] Appl. No.: 631,796

Related U.S. Application Data

[63] Continuation of Ser. No. 516,322, Oct. 21, 1974, abandoned.

[52] U.S. Cl. .................................. 210/420; 210/449
[51] Int. Cl.[2] ........................................ B01D 27/10
[58] Field of Search .......... 210/282, 283, 287, 420, 210/421, 424, 426, 429, 430, 433 R, 438, 439, 446, 449, 460

[56] References Cited

UNITED STATES PATENTS

| | | | |
|---|---|---|---|
| 554,281 | 2/1896 | Linke et al. | 210/420 |
| 818,264 | 4/1906 | Klumpp | 210/433 R |
| 868,828 | 10/1907 | Young | 210/420 |
| 2,773,601 | 12/1956 | Keller et al. | 210/449 |
| 3,789,991 | 2/1974 | Krongos | 210/449 |
| 3,822,018 | 7/1974 | Krongos | 210/420 |

Primary Examiner—Charles N. Hart
Assistant Examiner—Ivars Cintins
Attorney, Agent, or Firm—Reising, Ethington, Barnard, Perry & Brooks

[57] ABSTRACT

In accordance with the invention there is provided a water filtering device for attachment to a faucet comprising a generally tubular passage with an inlet for water from the faucet at its upper end and an outlet for water at the lower end, an annular water filtering chamber surrounding the passage, openings between the lower axial end of said chamber and the lower portion of said passage, openings between the upper axial end of said chamber and the upper portion of said passage, and a valve in said passage movable for blocking the flow of water directly from the upper portion of said passage to the lower portion of said passage whereby when said valve is closed water from the faucet is caused to flow from said passage into and through said filtering chamber and then back into said passage and out of the water outlet. Further in accordance with the invention there is provided a filter for the filter chamber, the filter having an arrangement of filtering layers which provides highly pure water while at the same time providing extended useful filter life.

2 Claims, 6 Drawing Figures

WATER FILTER DEVICE

This is a continuation of application Ser. No. 516,322 filed Oct. 21, 1974, now abandoned.

The subject matter of the present invention is a water filtering device for attachment to a faucet and a replaceable water filtering cartridge for use in such device.

It has long been proposed that water faucets, such as household water faucets, restaurant, office and other drinking water outlets, be equipped with a water filtering device such that the householder or other user can assure the potability of the water withdrawn from the faucet for drinking or cooking purposes. As far back as 1906 there issued to G. Klumpp U.S. Pat. No. 818,264 disclosing such a device, and in the meantime numerous patents have issued disclosing variations for such devices. In this regard, reference is here made to U.S. Pat. Nos. 989,965, 2,334,802, 2,368,035, 3,519,134, 3,780,869, 3,802,563, and 3,822,018. However, the fundamental difficulty has been — and the fundamental difficulty which remained up until the present invention — is that such a filtering device in order to be practical must on the one hand effectively filter the water to significantly increase its potability while yet, on the other hand, have a sufficiently long efficient filtering life so as not to require almost constant replacement. In this regard, it has long been recognized, as evidenced by the 1906 patent, U.S. Pat. No. 818,264, that it is desirable to incorporate into such a device means for bypassing the filter so that when water is withdrawn other than for drinking or cooking purposes, the filter not be engaged thereby to increase the life of the filter for continued use only for withdrawal of water from the faucet for drinking or cooking. However, the devices heretofore proposed have failed to meet a further requisite, namely, that the device be compact, simple of construction and hence economical. The problem has been compounded by the fact that as the years have gone by the standards for what would be considered potable water have greatly increased — and the higher the standards the greater the demand on the filtering device as regards filtering efficiency — and with this, in turn, rendering all the more difficult the problem of attaining relatively long efficient filtering life for the device at a sufficiently low cost as to render the device economically feasible for the householder or other user. In essence, then, there is need for a water filtering device for attachment to a faucet which at one and the same time provides potable water to today's high standards for potable water, and on a cost basis which is easily within the budget of the average householder.

The principal object of the present invention is to fulfill this need. Other objects, features, and advantages of the invention will appear more clearly from the following description of a preferred embodiment thereof made with reference to the drawings in which.

Figure 1:
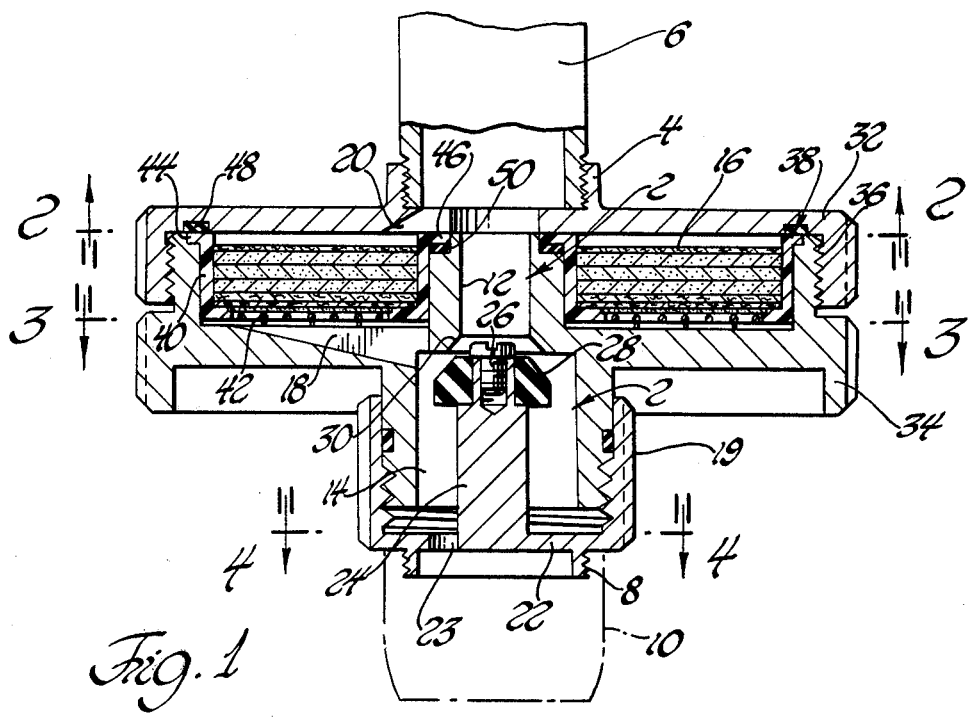
FIG. 1 is a cross-sectional view of a preferred embodiment of the device of the present invention shown attached to the faucet.
Figure 2:
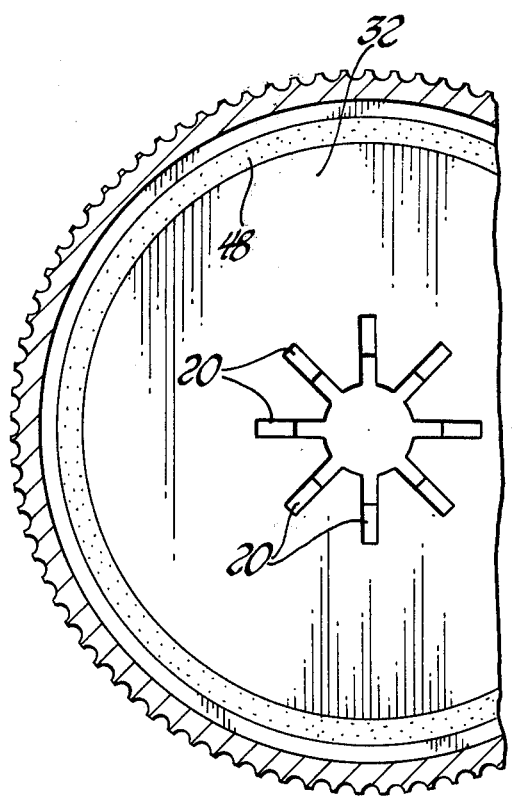
FIG. 2 is a section taken on line 2—2 of FIG. 1.
Figure 3:
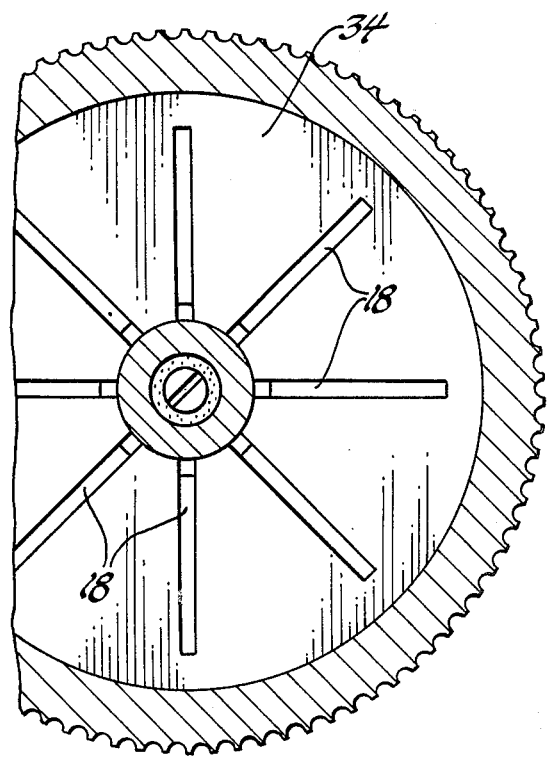
FIG. 3 is a section taken on line 3—3 of FIG. 1.

Referring to FIG. 1, the device comprises a generally tubular passage 2 having, at the upper end thereof as shown, an internally threaded collar 4 for threadedly securing the device to the end of a faucet 6. At this point it should be mentioned that most modern faucets are provided with an aerator threadedly engaged to the end of the faucet and hence it is simply a matter of threadedly disengaging the aerator from the faucet and replacing same by threadedly engaging the collar 4 to the end of the faucet in place of the removed aerator. At the lower end, as shown, of the passage 2 where the water exits from the device there is an externally threaded collar 8 which can threadedly receive the aerator 10 removed from the faucet, the aerator 10 being shown in broken outline and forming no part of the present invention.

When the device is secured to the end of the faucet, as aforesaid, the generally tubular passage 2 is aligned with the end of the faucet so that water exiting from the faucet is caused to enter into the passage.

The passage 2 has a portion 12 which is of relatively small diameter and a portion 14, at the lower end thereof as shown, of relatively large diameter. The relatively small diameter portion 12 of the passage is surrounded by an annular water filtering chamber 16 the lower axial end of which, as shown, is adjacent the large diameter portion 14 of the passage 2. A plurality of radially extending openings 18, which are in the form of tapered grooves in the inner surface of the lower wall of chamber 16, provide communication between the lower axial end of the chamber 16 and the large diameter portion 14 of the passage 2. Likewise, a plurality of radially extending openings 20, which are in the form of tapered grooves in the inner surface of the top wall of chamber 16, provide communication between the passage adjacent the upper end, as shown, of the small diameter portion 12 of the passage and the upper axial end of the water filtering chamber 16.

An internally threaded sleeve 19 is threadedly secured to the external surface of the large diameter portion 14 of the passage and hence the sleeve 19, by rotation thereof, can be moved up or down axially of the large diameter portion of the passage. Secured within the sleeve 19 by a wall 22 having a plurality of openings 23 therethrough (for exit of the water) is an upwardly extending projection 24 within and concentric with the sleeve, the upper end of the projection 24 having secured thereto by a screw 26 a conically tapered resilient washer 28, made of rubber or the like, for mated sealing engagement with a conical taper 30 provided at the lower end of the small diameter portion 12 of the passage 2. Hence, it will be seen that when the sleeve 19 is turned in a direction to cause it to move axially upwardly with respect to large diameter portion 14 of the passage, the washer 28 engages and blocks the lower end of the small diameter portion 12 of the passage and thereby blocks any flow of water from the small diameter portion 12 of the passage directly to the large diameter portion 14 of the passage. Such constitutes a valve, and with the valve closed, as aforesaid, to block the flow of water directly from passage portion 12 to passage portion 14, water from the faucet is caused to flow from the small diameter portion 12 of the passage through the openings 20 into and then through the filter chamber 16 and then from the lower axial end of the filter chamber through the openings 18 into the large diameter portion 14 of the passage, and from there to exit from the bottom of the passage 2.

Hence, with the sleeve being turned in one rotary direction such that the valve constituted by washer 28 is open, the water from the faucet is allowed to flow directly from the small diameter portion of the passage to the large diameter portion of the passage and exit therefrom thereby bypassing the filter chamber 16, whereas with the sleeve 19 rotated in the other direction the valve blocks the direct flow of water through the passage 2 and causes the water to flow through the filter chamber 16. This structure provides simple and efficient means for, on the one hand, causing bypass of the filter where filtered water is not desired, and, on the other hand, for causing the water to pass through the filtering chamber where filtered potable water is desired.

The axial ends of the filter chamber 16, namely, the upper axial end 32 and the lower axial end 34, are removably secured to each other, and therefor separable from each other, by reason of the threaded connection between these axial ends as shown at 36. This adapts the chamber 16, by separation of the axial ends thereof, to removably receive a replaceable water filtering cartridge 38, such water filtering cartridge being shown in FIGS. 4 and 5 as well as in FIG. 1. It will be understood that means other than a threaded connection can be used to removably secure together the axial ends of the chamber. For example, a bayonet type connection can be used instead of a threaded connection.

Figure 4:
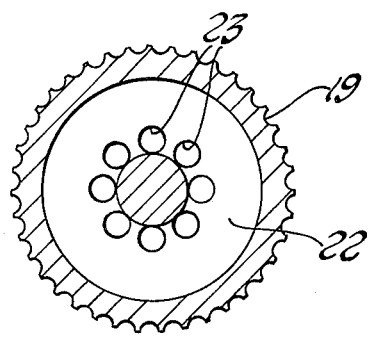
FIG. 4 is a section taken on line 4—4 of FIG. 1.
Figure 5:
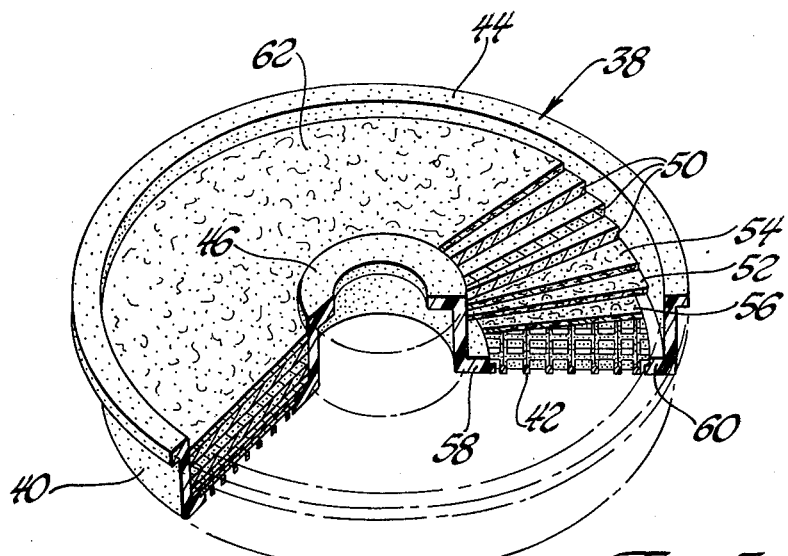
FIG. 5 is a perspective view with parts broken away of the filter cartridge shown in FIG. 1.

Referring now to FIGS. 4 and 5, in particular, the water filtering cartridge comprises an annular housing 40 open at the upper axial end thereof, as shown, for reception of water into the housing and having at the other, or lower axial end thereof, as shown, an annular wall with openings therethrough to allow exit of water from the housing. In the preferred embodiment, as shown, the housing is an organic resin molding the lower wall 42 of which constitutes an integral screen or grid and the upper, or open, end thereof, as shown, is provided with a radially outwardly extending flange 44 at the outer circumferential edge thereof and a radially inwardly extending flange 46 at the inner bore thereof. Referring for the moment to FIG. 1, it will be seen that a rubber or the like resilient gasket 48 is provided in the inner surface of the upper axial end of the chamber 16 to cooperate with the upper surface of radially outwardly extending flange 44 to provide a seal, and the upper end of the small diameter portion of passage 2 is likewise provided with a rubber or like resilient gasket 50 to cooperate with the underside of inwardly extending flange 46 to provide a seal. The housing 40 is of a size to fit snugly in the chamber 16 as can be seen in FIG. 1.

Referring again to FIGS. 4 and 5, within the annular filter cartridge housing 40 and adjacent the upper or open axial end of the housing is a filtering layer 50 containing particles of activated charcoal. In the embodiment shown in layer 50, in the aggregate, consists of a plurality of layers (specifically three layers in the particular embodiment shown), in combination, each of which layers consist of a fibrous matting impregnated with charcoal particles, the charcoal particles preferably being from about 5 microns to 50 microns in size and the pore size of the layer 50 preferably being between 20 and 50 microns. (In this instance and in all other instances herein where pore size is specified it is to be understood that that to which reference is made, in specifying pore size, is the size, i.e. the minimum size, of the particles blocked by the filtering layer involved. Hence, if the pore size of a given layer is 20 microns, particles of a size greater than 20 microns are blocked from passage therethrough). The fibrous matting used for the adherence thereto of the charcoal particles can be of any suitable fibrous material such, for example, as cotton or polyester or other synthetic fibers. The fibrous material can be of woven instead of matted construction if desired. The reason a plurality of layers is used to constitute the totality of the layer 50 is that to accomplish the most desired thickness of the layer 50, which is from about 0.1 to 0.2 inches while at the same time accomplishing optimum impregnation and adherence of the activated charcoal particles to the fibrous base for such layer, it is preferable to constitute the layer 50 of two or more separately prepared relatively thin layers of the fibrous material impregnated with the activated charcoal particles.

Adjacent, but in the preferred embodiment not abutting, the bottom perforated wall of the housing is a filter layer 52 consisting of a porous material preferably having a thickness of less than 250 microns, and typically from about 100 to 250 microns, and a pore size of less than 1 micron, and preferably a pore size of from about 0.2 to 0.5 microns. The layer 52 is preferably a unitary film of an organic polymeric material, such as a copolymer of acrylonitrile and polyvinyl chloride, having porosity as aforesaid. The film can have imbedded therein fibers, such as nylon fiber web, for reinforcement. Excellent for the practice of the invention is the product sold by the assignee of the present invention, the Gelman Instrument Company of Ann Arbor, Mich., under the trademark "ACROPOR". Whereas the purpose of the aforementioned activated charcoal-bearing layer 50 is to remove chlorine and other dissolved materials in the water, the purpose of the filtering layer 52 is to filter from the water submicron particles including bacteria, having a submicron particle size, and even, in the preferred embodiment, a particle size of 0.5 microns or less. The combination of layers 50 and 52 provide a filtered water having purification close to that of spring water.

Between layer 50 and layer 52 is an intermediate filtering layer 54. Intermediate filtering layer 54 can be of a fibrous material, matted or woven, such as polyester or other organic polymeric material (an example being Dacron); but the layer 54 should preferably have a pore size of from about 1 to 10 microns and less than the particle size of the activated charcoal particles in layer 50 but greater than the pore size of layer 52. The thickness of layer 54, if of a fibrous material, is preferably from about 200 to 800 microns. The function of the intermediate filtering layer 54 is to prevent relatively large sized particles from reaching filter layer 52. That is, whether it be charcoal particles washed from layer 50 or asbestos or other particles within the water itself, what we have found is that if provision is not made for preventing relatively large sized particles from reaching filter layer 52, filter layer 52 rapidly clogs, and therefore the filter cartridge has relatively short life, thereby requiring frequent replacement. By the provision of the intermediate filtering layer 54, the life of the filter cartridge, in providing filtered water close to the purification of spring water, is greatly increased. The intermediate layer 54 need not be of fibrous material but instead can be a unitary film the same or similar in composition and thickness to submicron pore size layer 52 but of a pore size as specified above for layer 54, i.e. preferably from about 1 to 10 microns and less than the size of the charcoal particles in layer 50 but larger than the pore size of layer 52.

In the embodiment shown there is provided, between the lower perforated annular wall of the housing 40 and the filtering layer 52 a layer 56 of porous material, preferably of synthetic fibrous material such as matting or woven cloth of fibrous natural or polyester or other synthetic organic fibers, having a pore size of greater than 10 microns, and preferably greater than 20 microns. The chief purpose of the layer 56 is simply to assure that the maximum filtering area of filter layer 52 is utilized in the filtration of the water. That is, the function of layer 56 is simply to physically separate submicron filtering layer 52 from the grid or screen forming the bottom wall of the filter cartridge so that less of the total area of filter layer 52 is blocked by reason of the area it contacts. The need for layer 56 can be reduced or eliminated by forming at least the upper, or inner, surface of the grid which constitutes the wall 42 of the filter cartridge housing to a triangular, or generally triangular crosssection such that the apices 57 of the triangular crosssection constitute the inner surface of the wall 42 thereby providing less area of contact between the wall and the filtering material while yet providing the necessary support for the filter material.

Figure 6:
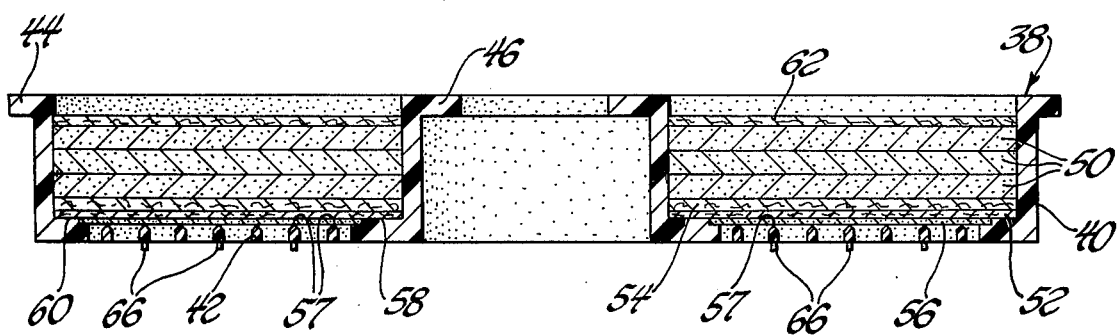
FIG. 6 is a cross-sectional view, in enlarged scale, of the filter cartridge shown in FIG. 1.

Further, in order to increase the area and volume of flow path between the bottom wall of the filter cartridge housing and the bottom wall of the filtering chamber receiving the cartridge, it is desirable to provide the lower surface of the bottom wall of the cartridge housing with small spaced downwardly extending projections, as shown at 66 in FIG. 6, thereby to space the grid which forms the cartridge housing bottom wall from the inner surface of the bottom wall of the chamber. The projections can take other forms such, for example, as short ribs.

As can best be seen in FIG. 5 the bottom wall of housing 40 is, in the preferred embodiment, provided with inner and outer circumferential flanges, 58 and 60 respectively. Bottom layer 56 fits between these flanges and layer 52 along with layer 50 are of slightly larger diameter and smaller internal diameter so as to extend from the inner to the outer wall of housing 40 above the flanges. The thickness of layer 56 is preferably from 100 to 300 microns.

In the preferred embodiment shown the outer edge of filter layer 52 is sealed to the upper surface of flange 60 and the inner edge of layer 52 is sealed to the upper surface of flange 58 whereby there is a water-tight seal between the layer 52 and the cartridge housing. Such inner and outer seals can be accomplished by heat-sealing or by a suitable cement. Where layer 54 is a film it is also desirable to seal the inner and outer edges of this layer to the housing.

Lastly, in the most preferred embodiment the open end of the filter cartridge receives, above the activated charcoal bearing filter layer 50, a porous layer 62, preferably the same or similar in pore size, thickness and construction, to layer 56, such layer being principally for the purpose of protecting the activated charcoal bearing layer 50 during handling of the cartridge prior to its insertion into the filtering device. Additionally, of course, layer 62 functions to, in the first instance filter large particles from the water before they ever reach the charcoal-bearing layer 50 — and hence enhances the life of the filter.

It will be understood that whereas the invention has been described in its particulars specifically with respect to preferred embodiments thereof various changes and modifications may be made fully within the intended scope of the claims which follow.

The embodiments of the invention in which an exclusive property or privilege is claimed are defined as follows:

1. A water filtering device for attachment to a faucet comprising: a passage having an upper portion with an inlet for water from the faucet and having a lower portion with a water outlet at the lower end thereof, a flat annular water filtering chamber surrounding the upper portion of said passage, said water filtering chamber having upper and lower axial portions removably secured together whereby said chamber is adapted to removably receive in fixed position therein a replaceable flat annular water filtering cartridge, sealing means in said chamber for sealing engagement with said cartridge to prevent flow of water through said chamber other than through said cartridge, one or more openings between the lower axial end of said chamber and the lower portion of said passage, one or more openings between the upper axial end of said chamber and the upper portion of said passage, said passage being otherwise imperforate to prevent radial flow of water between said passage and said filtering chamber intermediate the axial ends of said filtering chamber, a sleeve rotatably secured to the lower portion of said passage for movement between selected axial positions relative to said passage, and a valve mounted in said sleeve and projecting into the lower portion of said passage, said valve being movable axially thereof by rotation of said sleeve between a first position in which it blocks the flow of water directly from the upper portion of said passage to the lower portion of said passage whereby water from the faucet is caused to flow from said passage into and then axially through said filtering chamber and then back into said passage and out of said water outlet, and a second position in which said passage is open between said upper and lower portions to permit flow directly through said passage to bypass said filter chamber.

2. A water filtering device as set forth in claim 1 wherein the lower portion of said passage is of larger diameter than the upper portion of the passage and wherein said valve includes a washer which sealingly engages and thereby blocks the lower end of the upper portion of said passage when said valve is in said first position.

* * * * *